Dec. 23, 1969  O. G. KOPPIUS  3,484,925
FLUID COMPRESSION TECHNIQUE FOR MOLDING EDM ELECTRODES
AND OTHER TUNGSTEN-BASED COMPONENTS
Filed May 23, 1967
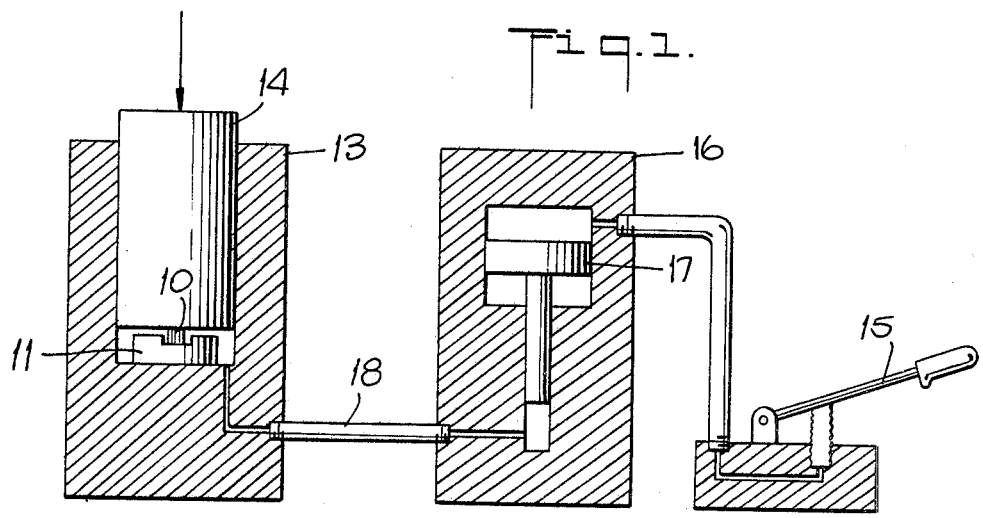
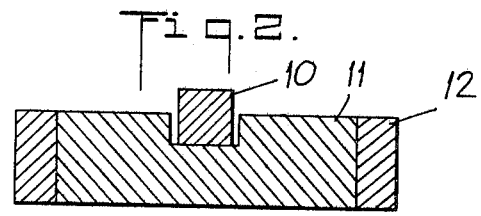
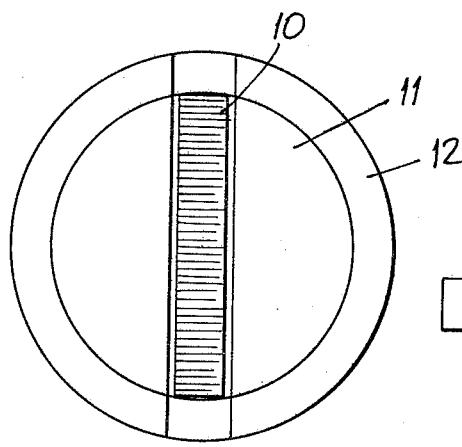
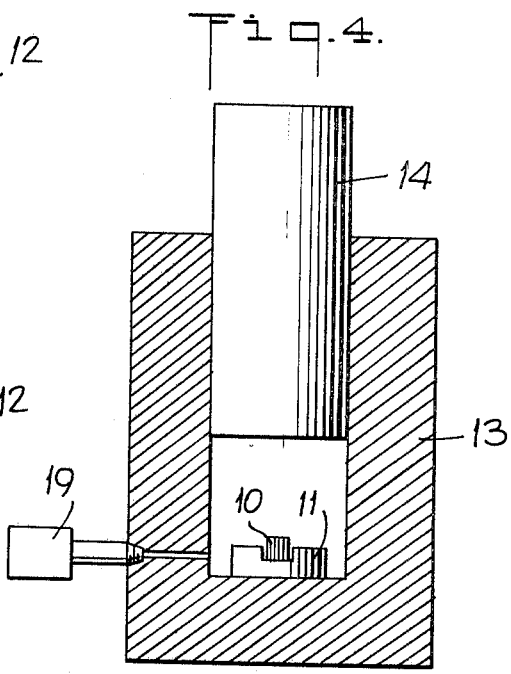
INVENTOR.
OTTO G. KOPPIUS
BY
ATTORNEY

United States Patent Office 3,484,925
Patented Dec. 23, 1969

3,484,925
FLUID COMPRESSION TECHNIQUE FOR MOLDING EDM ELECTRODES AND OTHER TUNGSTEN-BASED COMPONENTS
Otto G. Koppius, Florence, Ky., assignor of eighty-five percent to Kopco Industries, Florence, Ky., a corporation of Kentucky, and fifteen percent to Michael Ebert, New York, N.Y.
Filed May 23, 1967, Ser. No. 640,596
Int. Cl. B22f 3/24
U.S. Cl. 29—420.5                          4 Claims

ABSTRACT OF THE DISCLOSURE

Electrical discharge machining electrodes (EDM) and other tungsten-based components are fabricated by impregnating a sintered tungsten blank with copper or other suitable material, and subjecting the impregnated blank in a die to fluid compression.

---

This invention relates generally to techniques for forming EDM electrodes and other tungsten-based components, and more particularly to a fluid compression molding technique for this purpose which obviates the need for machining.

Electrical discharge machining commonly referred to as "EDM," is based on the controlled erosion of metal arising from a rapidly recurring spark discharge impinging on the surface being machined. The workpiece melts in a small area surrounding the point at which it is struck by the spark, and a portion of the liquefied or vaporized metal is expelled. This is accomplished by submerging the workpiece and the spark electrode or tool in a dielectric fluid which is circulated to flush away the eroded swarf.

Electrical discharge machining is a preferred method for forming accurate round holes, irregular shaped holes, slots and cavities in metal of all types. The principal limitation of this method, for purposes of producing parts on a large scale, lies in the cost of the EDM electrodes. Should it be possible to fabricate EDM electrodes, particularly those with a good wear ratio, cheaply and accurately in large quantities, then the EDM process could become a universal manufacturing tool.

At present EDM electrodes are made by machining methods, and since the electrode is slowly eroded away in the course of the EDM procedure, the cost of machined electrodes is a very significant factor in the overall cost of the procedure.

In my copending application, Ser. No. 614,606, filed Feb. 8, 1967, now Patent 3,407,475, entitled "Technique for Fabricating EDM Electrodes," there is disclosed a process wherein a billet constituted by a composite of tungsten and at least one metal chosen from a class consisting of copper, zinc and silver, in a ratio affording good EDM wear properties, is extruded under hydrostatic pressure in a die having the desired EDM configuration in an environment in which the pressure is applied to the billet going through the die and in which pressure is imposed after the extruded product leaves the die, the environmental pressure at all times exceeding the brittle-ductile transition of the tungsten composite.

The minimum environmental pressure given in said copending application is 50,000 p.s.i., which is just high enough for the tungsten composite to be slightly ductile when worked under tension, fairly ductile when worked under torsion, and moderately ductile when worked under compression.

The fact that the material is more ductile under compression than under tension is readily understood since the additional pressure necessary to squeeze the composite material into any given shape effectively increases the total environmental pressure. In tension, the pressure necessary to work the sample is effectively subtracted from the environmental pressure, whereas in torsion a small component of the torsional force is added to the environmental pressure.

The fact that any given brittle material can be worked more readily under compression than under tension simplifies the construction of the equipment considerably since only one high pressure chamber is needed. Further and most important, the technique of fluid compression molding permits the use of the maximum safe fluid pressure of the vessel as to the environmental pressure. This is not the case for fluid-to-fluid extrusion since a large fraction of the total pressure must be used to push the material through the die.

Thus under a higher environmental pressure of compression molding, tungsten copper composites can be worked with a density as high as 17.5. Such high density EDM electrode materials have exceptionally good wear rates, and they are particularly useful for making any part that has intricate structural detail. An added advantage is gained by the higher ductility under compression when molding tungsten copper composites within the 15.75 and 13.25 range, such as was described in said copending patent application.

At the present time there is an urgent requirement for small rectangular composite materials in two entirely unrelated fields. Certain I.B.M. paper punch cards require that small accurately punched rectangular holes be used to code information. Steel or carbide dies used to form these slots in the paper wear extremely fast and there is a high die replacement cost. A cheap EDM tungsten-copper electrode is needed so that rectangular holes in the die material can be electrically formed quickly and cheaply. Presently such EDM electrodes are made at high cost by machining techniques. In the microwave tube field, there is a need for small rectangular tungsten dispenser cathodes. These, too, are presently made by costly machining techniques.

Accordingly, it is the main object of the invention to provide a fluid compression techniques for molding EDM composites and other tungsten-based components such as dispenser cathodes, without the need for machining.

High pressure fluid compression molding of EDM composites is an alternate and effective technique for fabricating electrodes, for this method actually complements the high pressure fluid-to-fluid extrusion technique. Those composites which were found to be ductile under fluid-to-fluid extrusion are even more ductile under compression. As a consequence certain EDM electrode configurations can be made cheaper by this method. In addition, since the total environmental pressure is much higher, tungsten-copper composites with a density as high as 17.5 can be molded.

For a better understanding of the invention as well as other objects and features thereof, reference is made to the following detailed description to be read in connection with the accompanying drawing, wherein:

FIG. 1 schematically shows a fluid compression system in accordance with the invention;
FIG. 2 is a section taken through the die;
FIG. 3 is a plan view of the die; and
FIG. 4 is a simplified system in accordance with the invention.

The tungsten copper EDM composites described in my copending application are very ductile under compression. These include the tungsten-copper composites within the density range of 15.75 and 13.25 which have been shown to give superior EDM performance.

STEP 1

In fluid compression molding an EDM electrode, the first step is to produce a porous tungsten green compact. This is accomplished by supplying tungsten powder into a suitable press having upper and lower plungers to produce a compaction pressure on the powder of about 20,000 p.s.i.

STEP 2

The pressed green rectangular compact is placed in a hydrogen furnace and sintered at about 2300° C. for a period of 20 minutes to produce a tungsten matrix.

STEP 3

The sintered compact or matrix is then impregnated with copper or silver, or a combination of copper and silver, with or without the addition of zinc, in the ratios described in my copending application.

STEP 4

The impregnated tungsten body is placed in a die having a width of .080″+.0005 and a thickness of .040″±.0005, the die being open at the top and at both ends. This allows the impregnated tungsten to move sidewise and along its length as a flat plunger squeezes it down and decreases the thickness. The die along with the impregnated tungsten rectangle is placed in the high pressure vessel which is then pumped to a pressure of 200,000 p.s.i. by means of an external hydraulic pump. This pressure is the environmental pressure of the impregnated tungsten part.

Within the high pressure chamber and separate from it is another hydraulic cylinder, the pressure within which can be controlled from the outside by a second hydraulic pump. The ram of this second hydraulic cylinder is arranged so that it applies the compressional force on the tungsten part. When this ram meets the surface of the die then the tungsten part has been molded to the final dimensions.

Thus, once the environmental pressure has been established, the pressure in the second hydraulic cylinder is increased to a value that corresponds to a loading of 15 tons. At approximately this value the pressure in the second system suddenly increases which then indicates that direct contact has been made with the die and no further compaction is necessary. The resulting impregnated tungsten part has the exact width and thickness of the die. The ends of the formed electrode need not be square since a rectangular hole is electrically eroded completely through the die material, and therefore the shape of the end of the electrode is of no consequence.

It is to be noted that it is virtually impossible to fluid compression mold a material which is porous. If, for example one tries to compression mold a porous tungsten matrix, the pores fill with the hydraulic fluid and little or no movement of the bulk sample takes place, for the sample is under equilibrium hydrostatic pressure. The pores therefore must be filled with some material to prevent the entrance of the hydraulic fluid under high pressure fluid compression molding for making tungsten parts. The technique disclosed in Patents 2,669,009 and 3,076,916 for filling the pores of a tungsten matrix may be used to prepare the tungsten body before it is subjected to fluid compression.

Referring now to FIG. 1, there is shown schematically a system for fluid compression molding a sample which takes the form of a sintered tungsten matrix 10 of rectangular form, whose pores are filled with a metal suitable for EDM applications or for use as a dispenser cathode. The sample is placed in a die 11 having an open-ended rectangular cavity of the desired dimensions, the die being of a suitable carbide material and being surrounded by a steel reinforcing ring 12. The die is placed at the base of a high pressure vessel 13 provided with a plunger or ram 14. The high pressure vessel 13 is positioned between the platens of a hydraulic press (not shown).

Environmental pressure is imposed on sample 10 by means of a pump 15, whose output is applied to a pressure intensifier 16, provided with a piston 17, having a 10 to 1 area ratio, such that the pressure applied to the enlarged area of the plunger by the pump is multiplied by a factor of 10. The fluid acted upon by the small area of piston 17 is applied through a connecting pipe 18 to the interior of the pressure vessel 13.

Thus, in operation, the environmental pressure on the sample is determined by pump 15, while the hydraulic loading on the sample is applied by ram 14 independently of the environmental pressure.

FIG. 4 shows a simpler form of fluid compression molding system in which the pressure vessel 13 is used to create the high pressure environment as well as to apply the molding compression force. In this instance the sample 10 in die 11 is placed on the bottom of vessel 13, the cavity of the vessel is filled with water, and ram 14 is advanced by means of a calibrated hydraulic press. Excess water in the cavity is bled out by means of a valve 19 until a point is reached that when additional pressure is applied to the ram, the environmental pressure increases to the necessary value before it makes contact with sample 16.

Further advance of ram 14 then physically compresses the sample and at the same time increases the environmental pressure. The success of this method depends on the fact that water is compressible, and that such an increase in environmental pressure further increases the ductility of the sample. This method is less practical when a large compression movement is necessary.

The fluid compression molding technique makes it possible to fabricate dispenser cathodes using tungsten composites without machining. Typical of such cathodes are those disclosed in Patents 2,669,008, 2,700,000 and 3,076-916. In the microwave tube field, there is an urgent need for small tungsten dispenser cathodes having a thickness of .020″, a width of .040″, and a length of .250″. The fluid compression technique described above may be used to make such cathodes.

In order to eliminate the machining step in making such dispenser cathodes, it is necessary that the original pressed bar be sintered somewhere near the specified shape and size.

STEP A

In making dispenser cathodes of the above specified dimensions, the tungsten powder having a mean particle size of 4 micron is fed into an automatic pill press, the compaction die having a width of .045″ and a length of .300″. The upper and lower plungers of the press are adjusted so that the resultant compaction pressure on the powder at a thickness of .035″ is about 20,000 p.s.i. The pressed green rectangular compact has the following dimensions: a thickness of .035″, a width of .045″ and a length of .300″.

STEP B

The green tungsten compacts of step A are placed in a hydrogen furnace and sintered at 2300° C. for a period of 20 minutes. The compacts shrink and their sintered theoretical density falls between 82% and 83%. The final sintered dimensions are about a thickness of .028″, a width of .036″, and a length of .260″. It is essential at this stage that the sintered compacts have a thickness of more than .020″, a width less than .040″, and a length of at least .250″. This is necessary because sufficient material must be present such that after compaction both ends of the rectangle can be lapped square.

STEP C

The sintered compacts of step B are impregnated with the selected electron emissive material and then cleaned.

STEP D

The impregnated tungsten rectangles of step C are placed in a die having the following dimensions, a depth of .020″±.005, and a width of .040″±.0005. The die is open at the top and at both ends. This allows the impregnated tungsten to move sidewise and along its length as a flat plunger squeezes down and decreases the thickness. The die along with the impregnated tungsten rectangle is placed in the high pressure vessel which is then pumped to a pressure of 400,000 to 450,000 p.s.i. by means of an external hydraulic pump, this being the environmental pressure. The ram loading is adjusted to 20 tons in the manner described in connection with FIG. 4.

STEP E

The impregnated tungsten part produced in the die has the exact thickness and width of the die, but it is too long. Hence a lapping step is essential. To this end, several hundred pieces produced by means of step D are stacked endwise in a jig and then lapped square and to the assigned length.

STEP F

The lapped pieces of step E are washed in a light hydrocarbon solvent to remove all grease. They are dried and then hydrogen fired at 1200° C. for 2 minutes to remove all remaining impurities.

STEP G

The parts produced by step F are now ready for insertion in microwave tubes.

This technique produces dispenser cathodes whose performance is as good as those produced by prior art machining techniques, but at a substantially reduced cost.

While there have been shown preferred techniques in accordance with the invention, it will be appreciated that many changes may be made therein without departing from the spirit of the invention as defined in the annexed claims.

Thus while water is disclosed as the hydrogen fluid, under certain pressure conditions the water may change to ice and would not work. In lieu of water, one may use a light hydrocarbon fluid such as gasoline.

What I claim is:

1. The method of forming tungsten-based parts comprising the steps of:
   (a) depositing tungsten powder in a die and compressing the powder to form a green compact,
   (b) sintering the green compact to form a porous tungsten matrix whose size in thickness and width is close to that of the finished part,
   (c) impregnating the pores of the sintered matrix with a material which renders the part useful for its intended purpose, and
   (d) subjecting the impregnated matrix to high pressure fluid compression in a die having an environmental pressure therein at which the impregnated matrix is rendered ductile to mold the matrix to the desired dimensions.

2. The method as set forth in claim 1, wherein said tungsten matrix is impregnated with a metal chosen from the class consisting of copper, zinc and silver in a ratio affording EDM properties.

3. The method as set forth in claim 1, wherein said tungsten matrix is impregnated with emissive material to produce a dispenser cathode.

4. The method as set forth in claim 1, wherein said fluid compression is effected in a pressure chamber which is filled with fluid to produce an environmental pressure, the sample in the die under said environmental pressure being further subjected to hydraulic pressure to effect molding thereof.

References Cited

UNITED STATES PATENTS

| | | | |
|---|---|---|---|
| 2,175,899 | 10/1939 | Kelly. | |
| 3,069,757 | 12/1962 | Beggs et al. | 29—182.1 |
| 3,153,163 | 10/1964 | Foldes et al. | 29—182.8 X |
| 3,220,199 | 11/1965 | Hanlein et al. | 29—420.5 X |
| 2,370,242 | 2/1945 | Hensel et al. | 29—630 X |
| 2,425,053 | 8/1947 | Swinehart | 29—630 X |
| 2,757,446 | 8/1956 | Boegehold et al. | 29—420.5 |
| 2,813,807 | 11/1957 | Levi | 313—346 X |
| 3,076,916 | 2/1963 | Koppius | 29—25.11 X |
| 3,089,189 | 5/1963 | Feldman et al. | |
| 3,118,080 | 1/1964 | Koppius | 29—527 X |
| 3,225,169 | 12/1965 | Kosco | 29—630 X |
| 3,290,124 | 12/1966 | Holtzclaw | 75—208 X |
| 3,303,559 | 2/1967 | Holtzclaw | 75—208 X |
| 3,382,066 | 5/1968 | Kenney et al. | 75—208 |

JOHN F. CAMPBELL, Primary Examiner

D. C. REILEY, Assistant Examiner

U.S. Cl. X.R.

29—630; 75—208